United States Patent [19]

Matzek

[11] 3,732,356

[45] May 8, 1973

[54] COLOR AMPLIFIER

[75] Inventor: Lester Tucker Matzek, Lombard, Ill.

[73] Assignee: Warwick Electronics Inc., Chicago, Ill.

[22] Filed: June 2, 1971

[21] Appl. No.: 149,300

[52] U.S. Cl. ....................178/5.4 R

[51] Int. Cl. ....................H04n 9/12

[58] Field of Search ....................178/5.4 R; 330/29, 330/164, 185

[56] References Cited

UNITED STATES PATENTS

| | | | |
|---|---|---|---|
| 3,413,562 | 11/1968 | Hartin et al. | 330/29 X |
| 3,052,853 | 9/1962 | Smith | 330/29 X |
| 3,320,365 | 5/1967 | Auernheimer | 330/164 X |
| 3,502,800 | 3/1970 | Slavik | 178/5.4 R |
| 3,652,785 | 3/1972 | Schneider | 178/5.4 R |

*Primary Examiner*—Richard Murray
*Attorney*—Hofgren, Wegner, Allen, Stellman & McCord

[57] ABSTRACT

A transistorized color amplifier for the color circuit of a color television receiver with a current biased diode limiter circuit for preventing saturation of the amplifier.

8 Claims, 9 Drawing Figures

INVENTOR
LESTER TUCKER MATZEK
BY Hofgren, Wegner, Allen, Stellman & McCord
ATTORNEYS

COLOR AMPLIFIER

This invention is concerned with the color amplifier for color television and more particularly with a limiter for a transistorized color amplifier. In a color display device, as a color television receiver, utilizing a three gun color cathode ray tube, color signals are applied to each of the guns, controlling the relative intensity of the three color components (as red, blue and green). In the "RGB" type of system only these color signals are applied to one set of electrodes, such as the cathodes for example, and a color amplifier is required for each color. Each color amplifier must have a very similar transient response. In a circuit, it has been found that the response to high intensity color signals is not accurate. The infidelity is due to the operation of the transistor, following saturation which occurs with a high intensity signal. When the transistor saturates, the number of current carriers which are activated is so great that they cannot be dissipated instantaneously upon termination of the high intensity signal. Accordingly, conduction of the transistor tends to continue for a period following the high intensity signal. This results in an effect sometimes described as a "color smear" in which an area of color of decreasing intensity occurs immediately to the right of the high intensity portion of the picture. This smear effect is particularly severe with a low impedance driving source for the color signals, such as an emitter follower. Such a source is desirable to minimize the effects of the input capacitance of the color amplifier transistors, including the degenerative effect, at higher frequencies, of the collector-to-base capacitance. Such low impedance drive sources however are capable of delivering large amounts of current when the color amplifier transistor saturates, leaving a large number of carriers to dissipate after saturation.

In accordance with a principal feature of the invention, a signal limiter is provided in the input of the color amplifier circuit. More particularly, the signal limiter is a current biased diode connected in series between the color signal source and the color amplifier input circuit.

Another feature of the invention is that the source of color signal includes a driver transistor and the diode has a bias derived from the circuit of the driver so that the bias level varies with the level of the color signal.

And a further feature is that a capacitor is connected in parallel with the diode, improving the response of the circuit to high frequency signals.

Further features and advantages of the invention will readily be apparent from the following specification and from the drawings, in which.

The invention as disclosed herein is embodied in a color television receiver, and it is particularly suited for use in such a system where the amplitude of the color signal may vary substantially and subject the color amplifier to saturation conditions. The circuit may be used in other color display systems and also may be used in monochrome systems wherein similar uses of transistor amplifiers present similar problems of transistor saturation.

Figure 1:
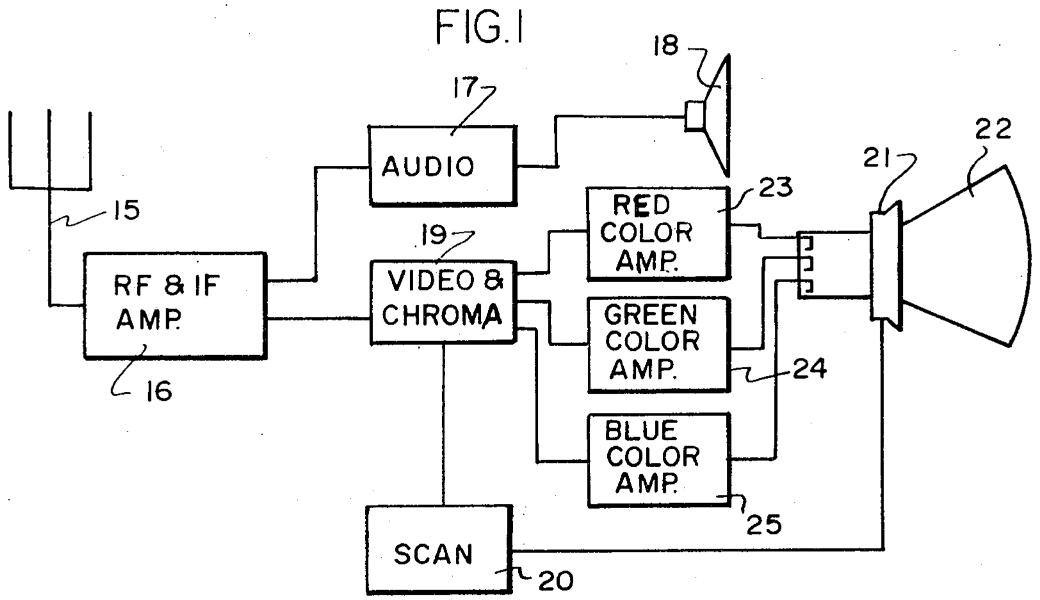
FIG. 1 is a block diagram of a color television receiver.

FIG. 1 shows a basic block diagram of a color television receiver. An antenna 15 is connected with RF and IF amplifiers 16 which select and amplify the signal. The audio portion of the signal is separated from the video and coupled through audio amplifier 17 to a speaker 18. The video portion of the signal is connected with video-chroma circuit 19 which has four outputs. One output includes the scan synchronizing information and is connected with scanning circuit 20 which produces the deflection currents. These currents are connected with a deflection yoke 21 to establish the raster on the face of color cathode ray tube 22. The picture itself is made up of red, green and blue information, connected through color amplifiers 23, 24 and 25 with the cathodes of display tube 22. These color amplifiers amplify both chroma and luminance information to provide color hue and intensity as well as picture brightness information.

Figures 2, 3:
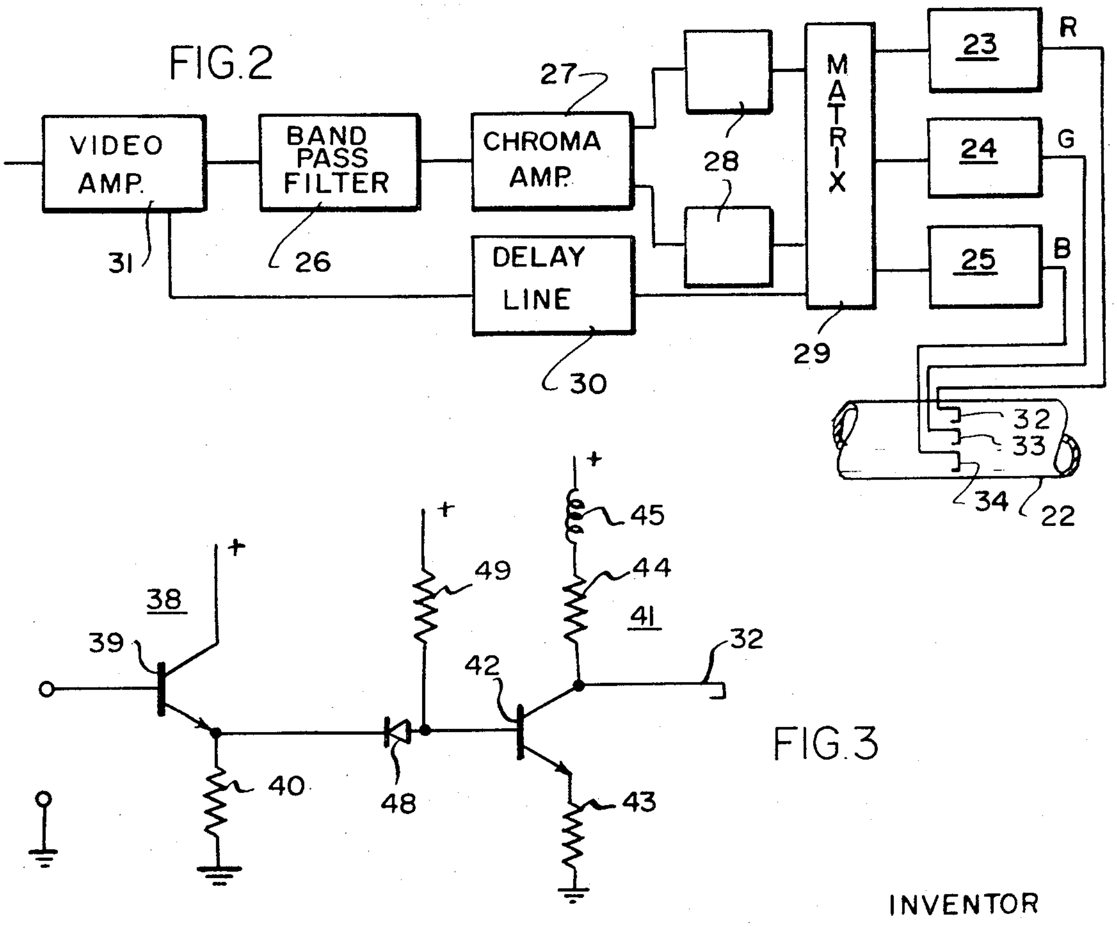
FIG. 2 is a block diagram of the video and chroma portions of the receiver.
FIG. 3 is a schematic diagram of a color amplifier circuit illustrating the invention.

Video-chroma circuit 19 is shown in more detail in FIG. 2. The output of video amplifier 31 is connected through bandpass filter 26, which passes over the 3.58 megacycle color subcarrier to a chroma amplifier 27. The output of the chroma amplifier is connected with the chroma demodulators 28, the outputs of which are combined with the luminance portion of the video amp output in matrix 29, in a suitable manner to reconstitute the three color signals, red, blue and green, which form the basis of the picture information in the transmitter. Delay line 30 provides proper time relationship of luminance and chroma demodulator output. The red, blue and green signals are connected with individual color amplifiers 23, 24 and 25, which are the subject of the present invention. The output of each of the three amplifiers is connected with one of the cathodes 32, 33 and 34 of the three guns of the cathode ray tube 22.

The individual color amplifiers 23, 24 and 25 may be identical, and the following discussion concerns only one such circuit. In FIG. 3, one of the color amplifiers, 23, is shown. A driver stage 38 includes a transistor 39 connected for emitter-follower operation. One of the color signals from matrix 29 is connected with the base of the driver transistor and the output is obtained across resistor 40, connected between the emitter and ground. The collector is connected with a suitable source of operating potential. Color output amplifier 41 is a transistor 42 having its emitter returned to ground through resistor 43 and its collector connected to a load resistor 44 and a peaking inductor 45, with a source of operating potential. The output, as to cathode 32 of the cathode ray tube, is derived across collector-resistor 44.

The color signal from driver 38 is applied to the base input element of color amplifier transistor 42 through a series connected diode 48 which is current biased in the conducting direction through a voltage divider network including resistor 49, connected with a source of potential, and driver emitter resistor 40, to ground.

The sense of the signal at the output of driver transistor 38 is positive, that is, the more intense the color, the more positive the signal. If diode 48 were not biased in the forward direction, no signal would be applied to the color amplifier 41. However, so long as the base current for the transistor does not exceed the bias current of diode 48, the color signal is applied without alteration to the transistor. The voltage divider through which the diode is biased is selected to provide a maximum signal current flow slightly less than that which occurs on saturation of the color amplifier.

The operation of the circuit in comparison with the operation of a circuit without the signal limiter is illustrated in FIGS. 6–9, which show the signal waveform as it appears at the collector of the color output amplifier 41. With low amplitudes of input signal, the voltage at the collector is high, approaching the source voltage indicated by line 51. As the amplitude of the signal increases, the voltage at the collector drops and approaches zero, limited only by the voltage drop across the emitter-resistor 43 at current saturation of the transistor, indicated by line 52. If the chroma signal is such that the saturation level 52 is exceeded, there is clipping, indicated by the broken line 53 which shows wave form as it would appear if not clipped. As pointed out above, on the occurrence of saturation, carriers build up in the transistor 42 which cannot be dissipated instantaneously as the signal amplitude decreases. The current through the transistor continues even though the signal drops as indicated by broken line 54. This continued current flow modifies the signal waveform as indicated by the shaded area in FIG. 7, producing a smear effect on the picture. The intensity of the signal is maintained beyond that which is desired, causing a streak of color to the right (the direction of movement of the horizontal scan) of the high intensity signal.

Figure 8:
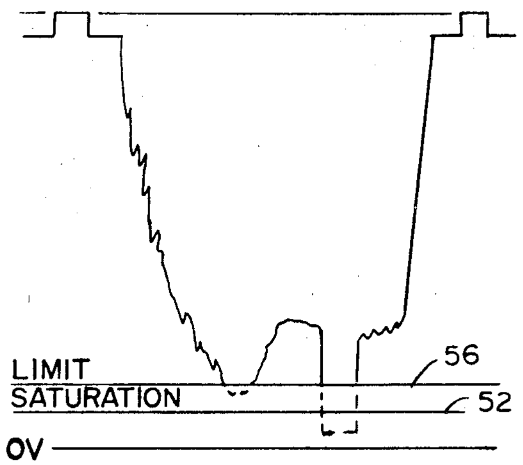
FIG. 8 is a waveform, similar to that of FIG. 6, illustrating the operation of the invention.
Figure 7:
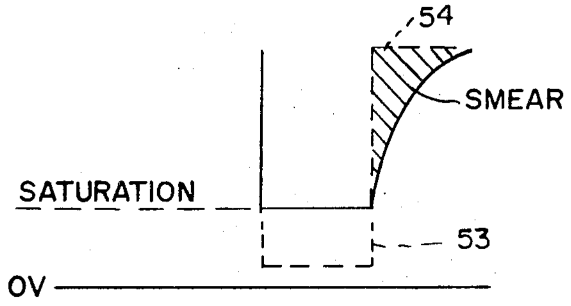
FIG. 7 is an enlarged portion of the waveform of FIG. 6.
Figure 9:
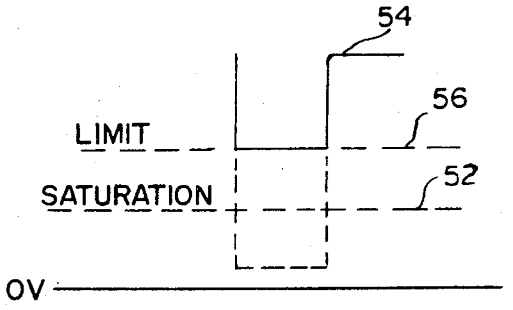
FIG. 9 is an enlarged portion of the waveform of FIG. 8.

With the circuit of the invention, the input signal to color output amplifier 41 is limited at a level indicated by line 56, FIG. 8, such that saturation is not reached. This eliminates the smear problem as it avoids the situation in which excess current carriers are developed in the color amplifier. The output signal at the collector of transistor 42 faithfully follows the driver signal and there is no exponential decay following a period of saturation as was the case in FIGS. 6 and 7. While this results in a slight diminution of the amplitude of the color signal, with an intense color, the response of the human eye to light is logarithmic, and the decrease in intensity is of little or no practical significance.

The fidelity of the picture, on the other hand, is markedly increased by the elimination of the smear effect. The output of the color amplifier follows closely the color signal, as indicated at 54.

The limiter 48 of the circuit of FIG. 3 preferably is a silicon diode, which has an abrupt current-voltage curve rather than a less expensive point contact germanium diode which has a more rounded or less abrupt current-voltage curve. The diode should also have a small storage effect and fast reaction time itself for best results. The action of the circuit is enhanced by the fact that the bias voltage divider for diode 48 is completed through emitter-resistor 40 of the driver-transistor. The current bias of the diode is reduced as the signal amplitude increases and the emitter of transistor 39 becomes more positive. This aids in establishing a limiting condition before saturation occurs.

Figure 4:
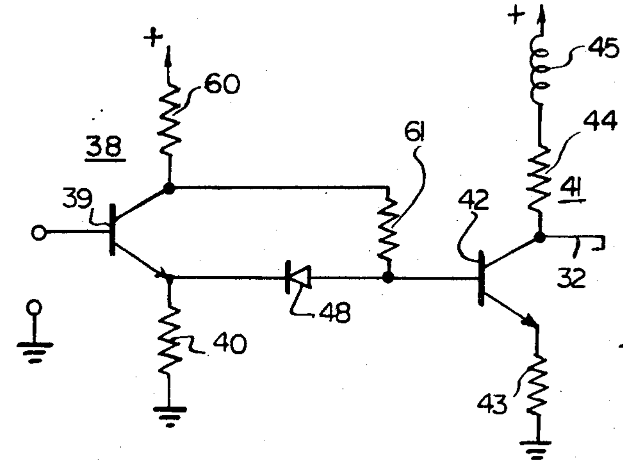
FIG. 4 is a schematic diagram of a modified color amplifier circuit.

FIG. 4 illustrates a modification of the circuit of FIG. 3 where the current bias of the diode is further modified in accordance with the amplitude of the signal. Circuit elements identified and described in connection with FIG. 3 are identified by the same reference numerals and will not again be described in detail. Driver transistor 39 is provided with a dropping resistor 60 in the circuit of the collector. Current limiting diode 48 is connected, through resistor 61, between the collector and the emitter of driver transistor 39. This increases the dependence of the diode bias current on the color signal level. As a result, the reaction of the circuit to a high amplitude signal is much faster. When a limiting condition occurs, the diode current is quite small. The transition range between limiting and not limiting covers only a small portion of the diode operation curve. As a result, operation of the circuit is quite linear outside the limiting range.

Figure 5:
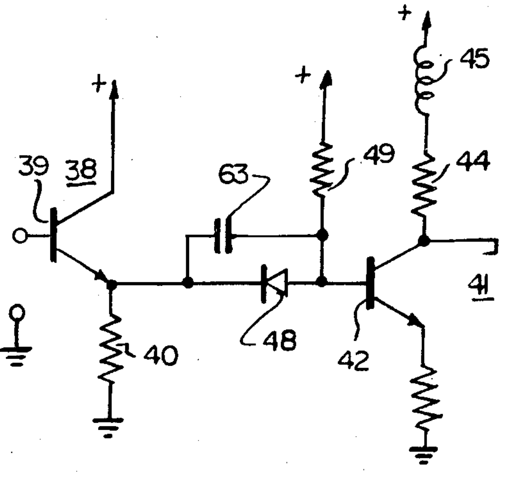
FIG. 5 is a schematic diagram of still a further modified color amplifier circuit.
Figure 6:
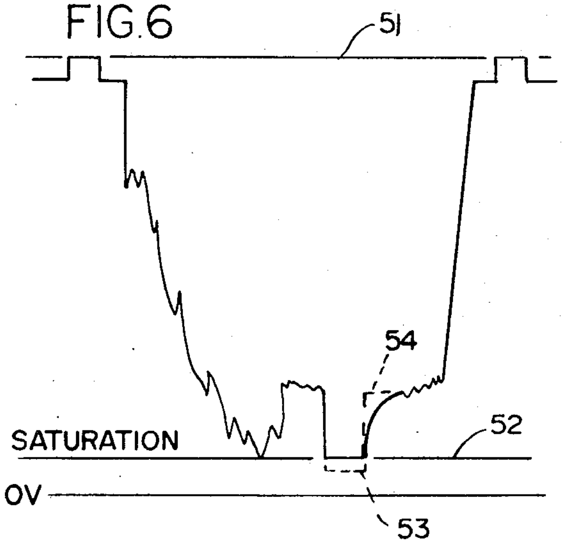
FIG. 6 is a waveform illustrating the color smear condition.

A further modification of the circuit is illustrated in FIG. 5. Again, elements previously described are identified by the same reference numerals. A capacitor 63 is connected in parallel with the diode 48. This capacitor keeps the impedance of the drive (to the base of amplifier 41) low for high frequencies in spite of the forward resistance of the diode. This in turn prevents the degenerative reduction in high frequency gain by the collector-to-base capacitance. The charge on capacitor 63 is dumped into transistor 42 at the start of a signal going toward saturation and the capacitance must be kept small enough so that the number of carriers this represents will not cause objectionable smear.

I claim:

1. In a color display system with a color signal input and a transistor color amplifier subject to current saturation with signal peaks, excess current carriers in the transistor causing a color smear following saturation, the improvement comprising:

a source of color signal;

an input circuit for said color amplifier, connected with said source of color signal; and a signal limiter in said input circuit to eliminate transistor saturation and the smear caused thereby.

2. The color amplifier of claim 1 in which said signal limiter is a biased diode.

3. The color amplifier of claim 1 in which said signal limiter is a current biased diode connected in series between said color signal source and said color amplifier input circuit.

4. The color amplifier of claim 1 in which said transistor color amplifier has a base input element and said signal limiter is a diode connected in series between said signal source and said base element, and including a source of bias potential for said diode and a resistor connecting the diode with the source of bias potential.

5. The color amplifier of claim 2 in which said source of chroma signal includes a low output impedance driver transistor and said diode has a bias derived from the circuit of said driver transistor.

6. The color amplifier of claim 5 in which said chroma signal is derived from one element of said driver transistor and a current bias for said diode is derived from another element thereof.

7. The color amplifier of claim 6 in which said driver transistor includes collector and emitter electrodes each connected with a source of operating potential through a resistor, and the chroma signal is derived from one of said elements and the bias signal from the other.

8. The color amplifier of claim 2, including a capacitor connected in parallel with said diode.

* * * * *